United States Patent [19]
Rennie

[11] 3,751,984
[45] Aug. 14, 1973

[54] COORDINATED PRECISE POSITION POLLUTION DETECTING

[76] Inventor: John Coyne Rennie, 33 3rd Ave., Bedford, Mass. 01803

[22] Filed: June 5, 1970

[21] Appl. No.: 43,723

[52] U.S. Cl........... 73/421 R, 23/230 EP, 73/432 R
[51] Int. Cl. ......................................... G01n 1/00
[58] Field of Search ................ 73/432 R, 421 R, 73/421.5 R, 23; 23/230; 244/77 B

[56] References Cited
UNITED STATES PATENTS
3,214,728  10/1965  Higgins ........................... 73/170
3,143,648  8/1964  Bradley ......................... 23/230 EP
2,879,663  3/1959  Thomas ............................ 73/23
2,918,579  12/1959  Slobod ............................ 23/230
3,472,469  10/1969  Evans et al. ..................... 244/77 B Primary Examiner—S. Clement Swisher
Attorney—Littlepage, Quaintance, Wray & Aisenberg

[57] ABSTRACT

An aircraft is precisely guided in point to point flight while collecting pollutant data from large bodies of water or air. Environmental pollutant data is recorded concurrently wtih aircraft positional data to provide an exact pollution profile for determining source, type and point to point levels.

4 Claims, 1 Drawing Figure

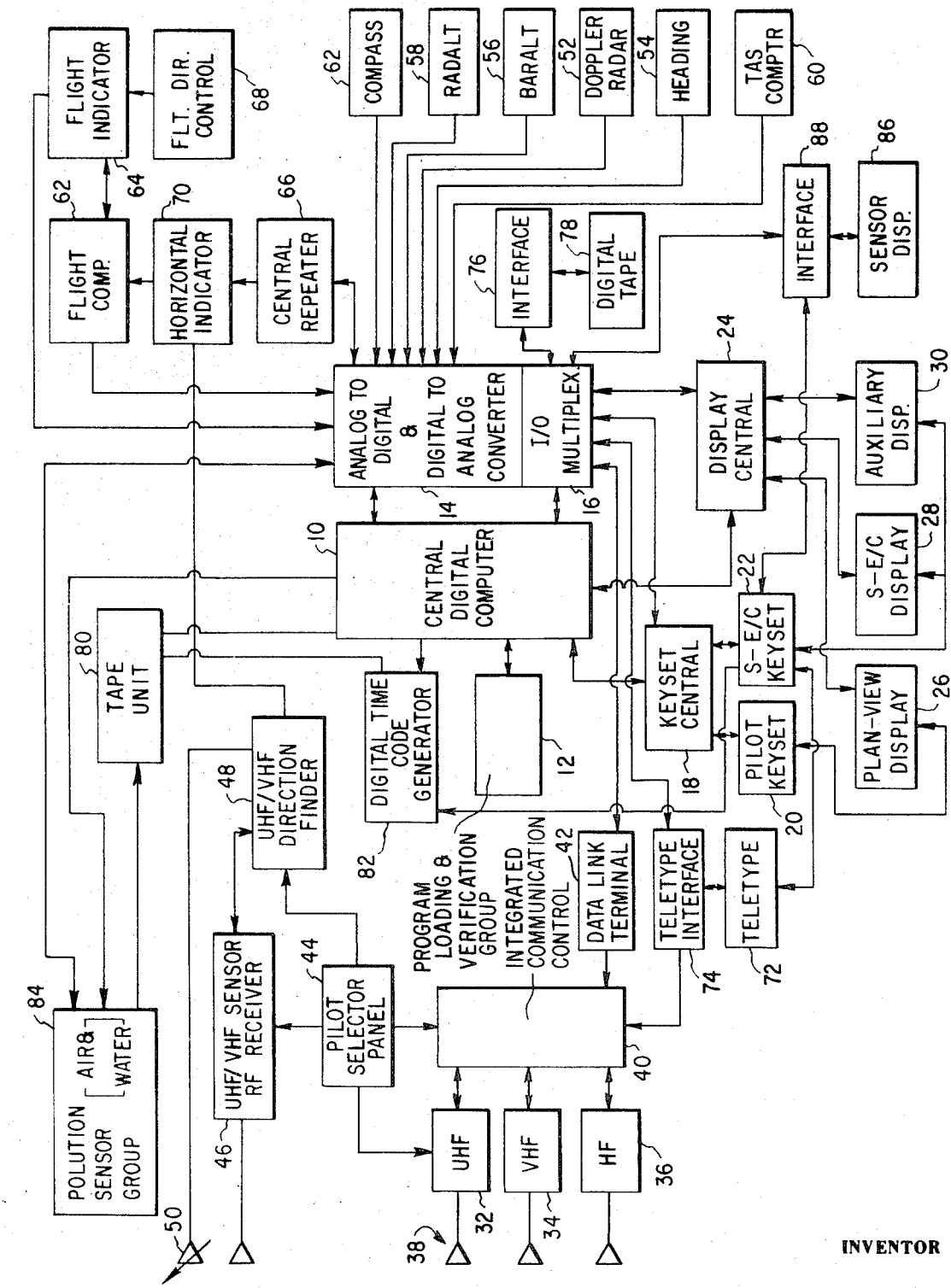
INVENTOR
JOHN C. RENNIE
BY *James C. Wray*
ATTORNEY

COORDINATED PRECISE POSITION POLLUTION DETECTING

BACKGROUND OF THE INVENTION

Several types of pollutant sensors and systems are now in use. Each has drawbacks which prevent or encumber the obtaining of pollution profiles which are useful in determining the source, nature and distribution of pollutants.

Typically a field service engineer or chemist obtains a sample or reading on a specific hand-carried sensor, or sampler instrument. He then hand records the reading, usually noting the position to the best of his ability. In sampling procedures, the taker usually packages the sample for analysis in a remote laboratory.

Permanent and semi-permanent sensors have been installed for varying periods at key locations of interest. Such devices are periodically sampled manually, or are continually sampled via radio network links.

A network of ground stations has been planned at key locations across the country. Those stations will be equipped with various analytical and storage equipment, and in some cases recorders, with or without telemetric links, to handle data generated at the station or generated by remotely located sensors or by other stations.

Deployable or temporary sensors are under development for use in different modes. In one such device, sensors are placed on buoys for near-shore line-of-sight monitoring. Data from such buoys, which are usually provided with single sensors, is transmitted to a monitoring station, usually via a radio link.

Individually transportable sensors and analyzers are carried, in some cases, in vehicles. Usually the vehicles are land vehicles; occasionally, the devices are carried in aircraft. The devices are non-integrated, and merely allow limited sampling in remote areas or in areas of sudden significance.

No overall system for the rapid and automatic collection of pollutant and positional data has previously existed. No system existed which might be flexibly interchanged for collecting either air pollutant or water pollutant data, or both, systematically at known times and places which may be readily changed from time to time as required. No system existed in which a vehicle was automatically directed between precise geographical points for generating reliable pollution profiles.

SUMMARY OF THE INVENTION

The present invention resides in an integrated avionic system in which an aircraft flight director, which includes navigational sensors, a computer and command displays, is used with multiple pollutant sensors and recorders to obtain precision pollution profiles which may be relied upon for pollution measurement, monitoring, control and enforcement, and for reliable environmental research. All of the individual elements of the system of the present invention are commercially available devices which are uniquely interconnected according to the present invention to provide the total system for pollution measurement. The system uses point to point automated naviagtion apparatus and methods and programming techniques as fully described in copending U.S. Patent Application Ser. No. 16,521, filed Mar. 4, 1970, by John C. Rennie. For purposes of clarity in focusing the present invention, the apparatus, methods, and programming techniques described therein are not set forth in detail herein. While the copending patent application principally describes an aircraft navigation system, the horizontal steering aspects of the system are applicable to the use of the present invention with water borne craft, surface effect vehicles, or land vehicles where appropriate.

Briefly summarized, the system described in detail in the copending patent application has a computer which samples navigation sensor inputs and operates on them in such a manner that the aircraft's precise position in latitude and longitude and X and Y components are computed continuously. In addition, the system accepts and recognizes any other points of interest in latitude and longitude or X and Y coordinate systems, and maintains the current aircraft position relative to those points when required. Th navigation program continually monitors navigation parameters such as altitude, true air speed at altitude with incremental vectors, and computes wind velocity at flight level. The system displays signals for returning the aircraft to a predetermined optimum track or computes new optimum tracks when maximum deviations from the tracks have been exceeded. The required route and the resultant steering commands are recomputed at very short intervals so as to always present the correct command instructions regardless of the pilot's response. Thereby, the system vectors the aircraft to precise preselected points along precise tracks.

In the present invention, the computer is integrated so that it accepts and requests when necessary data from a variety of air and water pollution sensors. The data from the sensors is entered manually or semiautomatically via a key set, automatically via the direct sensor-computer interface, or automatically decoding of telemetry signals. The program has prescribed parameter for each type of sensor which control that sensor's inputs. For example, control is exercised relative to such sensor input parameters as periodicity, discrete inputting or gating. Under the periodicity mode, the frequency with which a certain sensor readout is required is programmed and placed in the computer. In the discrete inputting mode, the sensor is sampled only at specific predetermined times or under predetermined conditions which are programmed into the computer. In the gating mode, sensor inputs are accepted only when they fall inside or outside of certain limits or gates.

Display from the computer presents alphanumeric data, planned position of the aircraft in relation to selected points and symbols of interest. Auxiliary displays present dynamic data, such as temperature versus depth profiles, and permit operator actions on the displays, for example, hook designation, rescaling and data tableau line-modification.

Via the computer, the operator aims or repositions sensors that are on board the aircraft, or deploys sensors which are extendable or detachable from the aircraft, such as dipping devices or buoys. The operator follows the displays to locate sources of serious pollution by inputting tactics which aid in efficient and accurate backtracking of out-of-specification samples to pollution sources. The operator also reacts to displayed data to insure the generation of adequate data for establishing a pollution pattern or profile, such as profiles of isotherms in large bodies of water.

Automatic storage of significant data is effected during flight, either at preprogrammed intervals or positions, or upon the occurrence of a discrete event such as the input from a sensor, the deployment of a buoy, or any other pertinent event. The data is recorded in standardized form, which can be retrieved during or after flight on a hard copy printout. The computer encodes outgoing messages automatically and decodes similar incoming messages. The messages may be in data link format, teletype format, or any digital format. The computer generates coded commands to deployed pollution sensors and to onboard sensors to activate, deactivate, set sampling modes, sample, and broadcast.

When on-board analysis of pollution samples is required, the computer provides analytical assistance. Step-by-step analysis sequences are displayed to eliminate check-off lists or procedures manuals. Semi-automatic analysis systems is given to an operator on a challenge-reply basis. Pollution data is automatically analyzed with no assistance from the operator.

Known program modules which are provided are executive routine and basic control, peripheral control, system test, initialization and recovery, inflight performance monitoring, and cues and alerts.

In aircraft which may be a fixed or rotary wing, or other form of hovering craft, the craft approches a known position by a known fixed object. Points at which sampling is to be accomplished or tracks along which sampling is to be accomplished have been preprogrammed into the computer. As the pilot reaches the known initial point, he depresses a switch starting the computer which then displays commands to follow to attain the desired track or to reach the desired points. Periodically, or at points upon the occurrence of special events sampling is accomplished or sensors are extended or deployed. As the sampling is accomplished, aircraft position and the environmental sensor inputs are recorded and displayed for further use of the operator. Steering commands for horizontal track and altitude change commands continue to be given throughout the flight. In a source detection mode of operation, known hunting techniques are employed for determining the strongest source and for following the strongest source of pollutants to its origin. Inversely, the same tracking system may be used to follow pollutants from a source to determine their total environmental effect.

This invention has as one object the provision of a method for precisely determining pollutant profiles of large bodies of environmental fluid.

Another object of this invention is the provision of combined apparatus for determining pollution profiles.

BRIEF DESCRIPTION OF THE DRAWINGS

The single FIGURE is a schematic diagram of elements used in carrying out the invention and their interconnection.

DETAILED DESCRIPTION OF THE DRAWING

A central digital computer 10 has a program loading and verification apparatus 12 which is preferably a magnetic tape unit or a paper tape reader. An analog to digital and digital to analog converter 14 is connected to the computer. An input-output multiplexer 16 is connected to the converter and to the computer. A digital entry key set 18 is connected to the computer and is served by a key set 20 by the pilot and a key set 22 by the environmental operator who is the sensor evaluator and controller, who is referred to in the drawing as the S-E/C.

Central display control 24 is connected to the central computer 10 through the input-output multiplexer 16. Display central 24 serves the pilot's plan view display 26, the controller's multipurpose display 28 and the controller's auxiliary readout display 30. In the communications subsystem, three transceivers, which are line of sight UHF transceiver 32, line of sight VHF transceiver 34 and high frequency long range transceiver 36, are served by separate antennas generally indicated by the numeral 38. Integrated communications control panel 40 and data link terminal 42 connect the transceivers to the input-output multiplexer 16. A pilot slector panel 44 is connected to the communications control as well as to a UHF/VHF sensor radio frequency receiver 46 and a UHF/VHF direction finder 48 with a tunable antenna 50. The communications subsystem provides communication with ground stations, with other aircraft and with prepositioned sensor devices.

Transmission is possible by voice or by digitally coded signals using normal communications paths as well as ground, air and satellite relays.

The elements of the navigation system are identical with the above-identified copending patent application. Doppler radar 52, inertial quality heading reference 54, barometric altimeter 56, radar altimeter 58, true air speed computer 60, and remote magnetic compass 62 are all connected to the analog to digital converter 14 for input to computer 10. UHF/VHF direction finger 48 is also a useful navigational input. The input devices are sampled at preprogrammed intervals by the computer to provide the basic data with which the computer calculates latitude and longitude in X and Y positions of the aircraft, as well as aircraft track, its direction and speed, drift angle, magnetic variation and wind. The VHF and UHF direction finder is used to locate buoys when they are used. In the manner described in the copending application, central computer 10 is connected to flight director computer 62, flight director indicator 64 and central repeater 66 via the converter 14. A flight director control box 68 is connected to the flight director indicator, and horizontal situation indicator 70 is connected to the flight director computer 62 and to the central repeater 66. The horizontal situation indicator 70 is also connected to the direction finder 48 when the system is operating in signal tracking mode.

Related to the flight director and repeater systems shown in the upper right-hand corner of the drawing, are the pilot's key set 20 and the pilot's digital plan view display 26 in the lower center of the drawing. Together these devices present steering commands, navigational data, cues and alerts and flight patterns to the pilot. The key set allows the pilot to communicate with the computer regarding manipulation of his displays, to acknowledge a computer action, or to request a function or data base information.

The sensor displays 28 and 30 provide data to the controller so that he can effectively direct the necessary data gathering patterns, adequately control various sensors when required, and properly evaluate sensor data which is not merely recorded. Auxiliary display 30 is used to insert important flight data, to obtain status of the system and aircraft, and to otherwise access the computer's data base as necessary. The auxiliary display preferably has a capability of composing teletype messages and reading teletype messages which are received and automatically decoded by the computer. Teletype 72 and teletype interface 74 provide this capability with the communications control 40 and with the controller's key set 22.

A magnetic interface 76 and a digital magnetic tape reader and recorder 78 are connected to the input-output multiplexer of the computer 10.

A data storage and recording subsystem has the capability to store both digital data and analog data. Digital information is automatically recorded on the basis of preprogrammed instructions in the data storage program module. Analog data is recorded on a multiple track high fidelity tape. Individual track inputs for the recorder 80 are selected by the controller, and the tape is digitally time-coded by generator 82 for post-flight analysis.

The present apparatus can be installed in a wide variety of air vehicles, small or large, fixed or rotary wing. The congifuration of the vehicle together with the true size allotment and mission requirements greatly affects the optimum configuration for a given application. In preferred operational ranges, altitudes are from zero to 10 thousand feet, air speeds are from $-30$ to $+450$ knots, temperatures are from $-40$ to plus $100°$ C., humidity is from 10 percent to 100 percent relative humidity. The system in the aircraft should be capable of $10°$ nose up and $10°$ nose down and $45°$ bank left or right. A mission endurance of up to 4 hours and all-weather day or night capabilities are useful. In some applications, the sensor package can be altered to be more responsive to particular missions. Detachable pods or instrument packages provide that flexibility. It is preferable that a sampling vehicle be equipped to accept such packages or pods which are generally indicated by the numeral 84 in the drawing.

Preferably, modern built-in test equipment, system test software and diagnostic software is used, permitting location of failures and replacement of units, and insuring rapid turn around between flights. Also, limited in-flight replacement of vital parts is provided.

Since the present system is designed for various missions in the pollution control field, the sensor subsystem is flexible and can contain different combinations of sensors in each appliation. Each sensor has a unique equipment coding which is identified in the computer. The sensors used with the present invention fall into two major classifications, namely configuration and composition.

A number of sensor configurations are useful, generally the sensors are fixed, pod mounted, cable attached, or deployable. Fixed sensors are mounted permanently in an aircraft because they are either important to all missions or because the nature of their integration or installation dictates a permanent attachment to the aircraft.

Detachable pods or packages are installed and electrically connected according to mission designations. Except in emergencies the sensor packages are retained onboard throughout the flight.

Certain sensor combinations are configured so that they may be lowered or trailed from the air veicle via the cable. The cable is selectively deployable and retractable so that in the stowed position the sensor module is housed within or close aboard the aircraft. The device can be extended away from the vehicle at various precisely measurable distances. The cable besides providing physical attachment and support of the sensor also provides electrical communication for the input and output transmissions.

The system has the capability to deploy certain sensors such as by the sensor dispenser 86, which is connected to the computer and to the controller's key set through an interface 88. The system then receives data from the deployed sensors, or from sensors previously placed by other vehicles, usually by modulated or coded radio link. The radio frequency data is decoded or demodulated and converted to the required format for display, analysis and recording.

Sensor composition may be considered in three general categories according to flight, water quality and air quality parameters. The sensors concerned with flight parameters reveal information about the air vehicle's operation and the atmosphere in which it is operating. These parameters are important both in the assessment of the water quality and the measurement of air quality. Further, they provide important additional information concerning sampling techniques.

Water quality parameters, which are used to judge the overall quality of a body or of a portion of a body of water, generally fall into the following categories: hydrological and metrological, physical, inorganic, organic, nutrients, microbiological, biological. Table 1 contains more detailed lists of the specific parameters of water pollution within each category.

Air quality sensors are used to develop a profile of the quality of an air sample or series of samples. Such sensors usually sense for pollutants falling into the categories of: particulates, gases, odors, physical characteristics. Table 2 describes specific pollutants considered within the categories.

TABLE 1.—WATER QUALITY PARAMETERS

| Hydrological and meteorological | Physical | Chemical (inorganic) | Chemical (organic) | Nutrients | Microbiological | Biological |
|---|---|---|---|---|---|---|
| Volumetric flow rate. | Temperature (surface). | Dissolved $O_2$. | BOD. | Organic N. | Caliform. | Plankton. |
| Velocity. | Specific conductance. | Dissolved $CO_2$ | COD. | $NH_3$-N | Fecal strepto. | Periphyton. |
| Time of flow. | Turbidity. | | Chlorine demand. | $NO_2$-N | Total plate count. | Benthos. |
| Depth. | Light penetration. | Hydrogen sulfate. | Total org. carbon. | $NO_3$-N | Salmonella. | Fish. |
| Tide variation. | Color. | Minerals. | Total P. | Shigella. | Chlorophyll. |
| Wind speed/direction. | Odor. | Trace elements. | MBAS. | Soluble P. | Viruses. | |
| Solar radiation intensity. | pH. | Radiochemical properties. | CCE. | Organic P. | | |
| Air temperature. | Total solids. | | CAE. | Orthophosphate. | | |
| Air humidity. | Suspended solids. | | Cyanide. | Polyphosphate. | | |
| | Settleable solids. | | Pestitices. | | | |
| | Sediment concentration. | | Oil. | | | |
| | Particle size. | | Grease. | | | |
| | Bed load. | | Phenolics. | | | |
| | Temperature vs. depth profile. | | | | | |

TABLE 2.—AIR QUALITY PARAMETERS

| Particulates | | Gases | Photochemical | Odors | Physical |
|---|---|---|---|---|---|
| Dusts/sprays | Fumes/mists | | | | |
| Flour. | Calcination. | Sulphur oxides. | NO—O. | MS | Temperature. |
| Feed. | Sintering. | Hydrocarbons. | $O_3$ | Mercaptans. | Inversions. |
| Fertilizer. | Roasting. | Carbon monoxide | PAN. | Phenols. | Relative humidity. |
| Chemical. | Combustion. | Nitrogen oxides. | | Aldehydes. | Wind direction/speed. |
| Rubber. | Distillation. | Smog (Los Angeles). | | Acrolein. | Barometric pressure. |
| Plastics. | Electrochemical. | | | | |
| Pigment. | Chemical. | | | | |
| Cement. | | | | | |
| Ceramics. | | | | | |
| Metals. | | | | | |
| Sand. | | | | | |
| Wood. | | | | | |
| Fly ash. | | | | | |
| $SO_3$ | | | | | |
| Smog (London). | | | | | |

Examples of suitable sensors for water quality are: bathythermograph for temperature, electrical conductivity meters, dissolved oxygen meters, turbidity guages, dissolved chlorides detectors, solar intensity meters, ionized hydrogen gauges(pH),fathometers. These sensors are used in conjunction with clocks, wind speed directions, air temperature and air humidity sensors, to give an accurate indication of the ambient conditions in which the sampling is accomplished.

Air quality sensors which are useful with the present invention are, for example, $NO_2$, $O_3$, $SO_2$, H, CO, $CO_2$, oxidant, HS, and hydrocarbon analyzers, stack, high volume, dust, sequential, spot and tape precipitation samplers, chromatographs, colorimeters, spectrophotometers, radiation meters, atomic absorption units, carbon filters, densimeters. Preferably, clocks, temperature and humidity gauges and wind speed and direction indicators are used concurrently with other samplers for a similar knowledge of the ambient conditions.

The present apparatus can be deployed to virtually any location over land or over water. The navigation system permits precise vehicle positioning without the necessity of external navigation aids. The range of the air vehicle is the only factor limiting deployment.

In one operational example of the apparatus and method, the appropriate pollution sensors 84 are mounted on an aircraft. A digital tape is provided in reader 78 to control the aircraft flight direction and the type of sampling to be accomplished. As the pilot reaches a predetermined known geographical point, he depresses a button on the pilot key set 20 and the flight indicator and horizontal situation indicator 64 and 70 begin displaying commands for the operation of the aircraft.

At times indicated by the digital tape on reader 78, the sensor units in group 84 are keyed and record their output in tape unit 80. The tape is synchronized with digital time codes from generator 82 for later comparison with the digital flight instruction tape at 78. Aircraft position is supplied to tape unit 80 by central computer 10 for recording with the sensor information. The sensing and recording is continuous over the track of the aircraft, or the sensing and recording is periodic as controlled by the digital tape at 78 or by the controller at his key set 22.

While the invention has been particularly shown and described with reference to a preferred embodiment thereof, it will be understood by those skilled in the art that various changes in form and details may be made therein without departing from the spirit and scope of the invention.

What is claimed is:

1. The pollution sampling method comprising rapidly and automatically sampling unnatural environmental pollutants and collecting pollution data and coordinating the pollution data with positional data by positioning an aircraft in a precise predetermined known position with respect to a fixed reference by flying and directing the aircraft along a predetermined flight path track from the fixed reference to a second predetermined fixed geographical point by detecting airspeed, ground speed and altitude and measuring movements of the aircraft along the track and transverse to the track and by guiding the aircraft along the track by displaying directions for returning the aircraft to the flight path track, periodically sampling environment and environmental pollutants along the flight path track and at the predetermined geographical fixed points, and directing the aircraft along a second predetermined flight path track to a third predetermined point and further periodically sampling pollutants along the second flight path track and at the third predetermined fixed point, and concurrently recording the fixed points and flight path tracks, incremental aircraft positions with respect to the points and tracks and pollution sample data at the incremental aircraft positions.

2. The method of claim 1 wherein the sampling steps comprise detaching and deploying sensors from the aircraft at the fixed geographical points and sampling water and pollutants in the unattached sensors and communicating by radio pollutant data back to the aircraft from the detached and deployed sensors.

3. The method of claim 1 wherein the sampling steps comprise sampling air and pollutants therein.

4. The method of claim 1 further comprising creating a new predetermined track and determining location of the second point according to pollutants sampled at the first point for determining points of maximum pollution.

* * * * *